United States Patent [19]
Isler et al.

[11] Patent Number: 5,379,965
[45] Date of Patent: Jan. 10, 1995

[54] PLASTIC REEL FOR MATERIAL WINDING

[75] Inventors: Herbert Isler, Staufen, Switzerland; Karl-Gunter Schmidt, Coburg, Germany

[73] Assignee: Swil-Technik AG, Niedererlinsbach, Switzerland

[21] Appl. No.: 13,946

[22] Filed: Feb. 4, 1993

[30] Foreign Application Priority Data

Feb. 5, 1992 [CH] Switzerland .............. 336/92

[51] Int. Cl.$^6$ .............. B65H 75/22; B65H 75/28
[52] U.S. Cl. .............. 242/586.6; 242/608.3
[58] Field of Search .............. 242/117, 116, 115, 71.8, 242/71.9, 77.3, 118.6, 118.61, 125.1, 125.2, 586.6, 586.4, 586.5, 608.3, 608.4

[56] References Cited

U.S. PATENT DOCUMENTS

| | | | |
|---|---|---|---|
| 1,408,261 | 2/1922 | Brookhart | 242/125.1 X |
| 1,625,503 | 4/1927 | Schooley | 242/117 X |
| 2,193,407 | 3/1940 | Hagen | 242/117 |
| 2,442,398 | 6/1948 | Chandler . | |
| 2,499,268 | 2/1950 | Crooks | 242/118.6 |
| 2,846,162 | 8/1958 | Allin et al. | 242/117 |
| 4,471,919 | 9/1984 | Leunig | 242/115 |
| 4,976,475 | 12/1990 | Bjorkquist | 242/116 X |

FOREIGN PATENT DOCUMENTS

| | | | |
|---|---|---|---|
| 1219868 | 5/1960 | France . | |
| 1916306 | 10/1970 | Germany | 242/117 |
| 2245595 | 3/1974 | Germany . | |
| 2822213 | 11/1979 | Germany . | |
| 3712680 | 10/1988 | Germany . | |
| 2074642 | 11/1981 | United Kingdom . | |

*Primary Examiner*—John M. Jillions
*Attorney, Agent, or Firm*—Stroock & Stroock & Lavan

[57] ABSTRACT

The reel comprises a two-part core 2 with a shape of a hollow cylinder, with a flange 3 at each of its two ends. The flange 3 and the core 2 are positively engaged in the circumferential and radial direction, and are connected to one another by at least four detachable connection elements per flange 3. By means of this design, large forces and torques can be transferred between the flange 3 and the core 2 so that larger reel diameters of plastic can also be constructed.

9 Claims, 11 Drawing Sheets

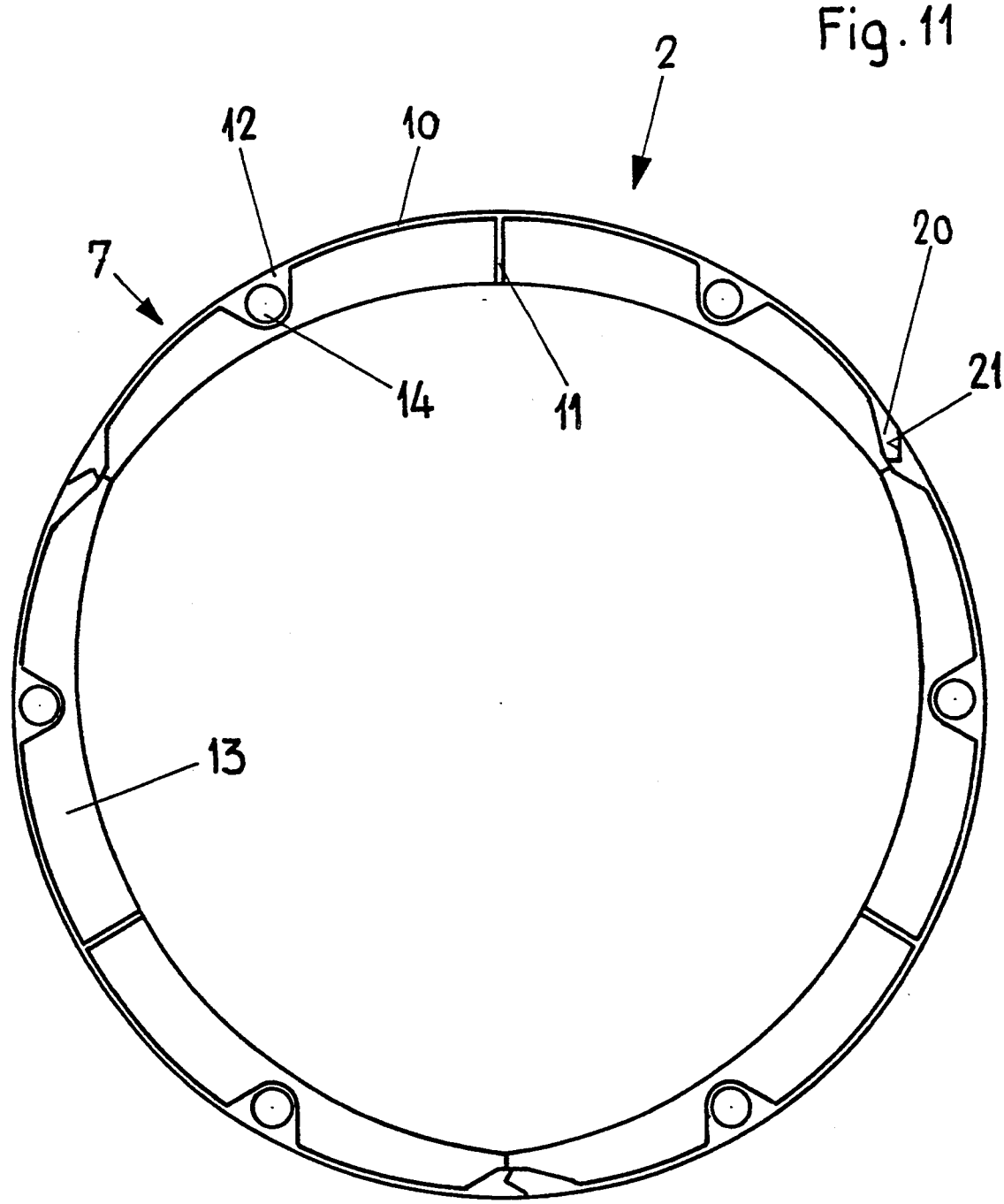

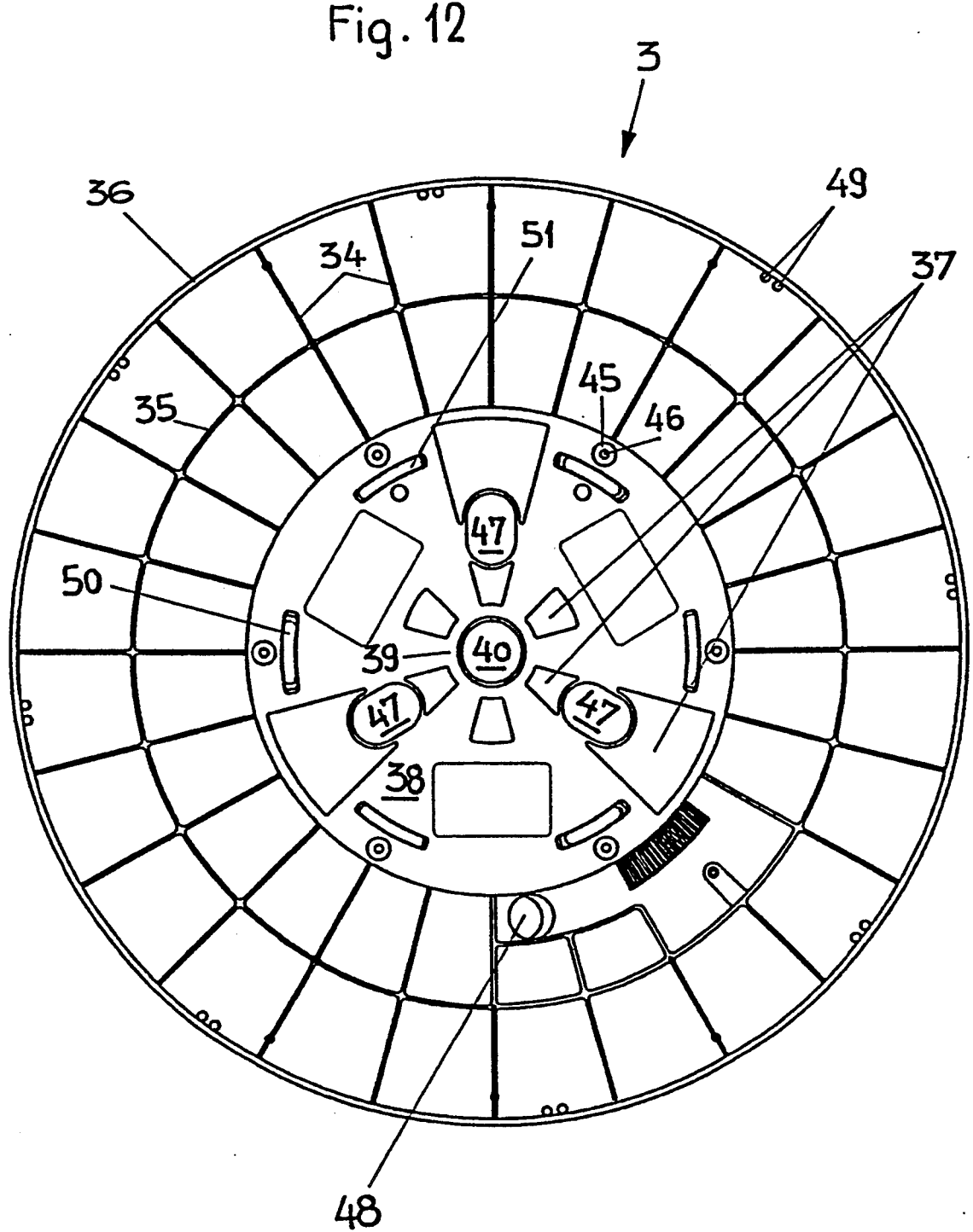

PLASTIC REEL FOR MATERIAL WINDING

BACKGROUND OF THE INVENTION

This invention relates to a plastic reel for winding material and more particularly, to an improved reel for winding cable.

A plastic reel consisting of a two-part core and two flanges is known from the DE-PS 37 12 680. The halves of the core positively engage, in the axial direction, the circumferential grooves of a hub that is integrally attached to the flanges. In the circumferential direction, the engagement is non-positive. The flanges are clamped against the core halves by tie rods which pass all the way through.

The DE-OS 2 245 595 proposes that plastic reels be produced from cast polyamide by in situ polymerization. Here the core is inserted, with a tubular attachment, into an annular groove of the flange, so that it interlocks positively in the radial direction. The flanges are likewise clamped against one another by means of tie rods.

From the FR-PS 1 219 868, it is further known, that core halves of a plastic reel can be connected positively to the flanges in the circumferential direction. For the connection in the radial direction, one uses sprung bolts, shaped like a truncated cone, which latch into conical recesses in the core halves.

Another plastic reel, consisting of a hollow cylindrical core and two flanges, is known from the DE-OS 28 22 213. The core is designed in two parts and positively engages the flanges in the axial direction. Cotter pins are used to make a positive connection in the radial and circumferential direction. They are inserted into the flanges, gripped behind an axially protruding ring of the core halves, and act as dogs with respect to the radial ribs of the core. However, only moderate torques can be transmitted with this type of connection.

All these reels have in common that, at least in one are not suited for larger reel diameters and consequently for wound material of considerable weight.

It is an object of the present invention to design a plastic reel in such a fashion that it is also suited for larger reel diameters. This object is achieved by the combination of characteristics according to the claims.

SUMMARY OF THE INVENTION

A reel made of plastic for winding material such as cables is formed from a cylindrical core and two flanges positively engaged at both ends of the core. The hollow cylindrical core is formed of at least two core parts whose outside surfaces when joined form a circular cylindrical shape. The two flanges disposed on each of the two face ends of the core positively engage the respective ends of the core in the radial and circumferential directions. At least four removable connection elements per flange connect the flange with the core in the axial direction.

Accordingly, it is an object of the invention to provide an improved plastic reel.

Another object of the invention is to provide an improved plastic reel having improved engagement between the core and flanges.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 11 shows a second embodiment of a core; and

FIG. 12 shows a view of a variant of the flange.

DESCRIPTION OF THE PREFERRED EMBODIMENT

Figure 1:
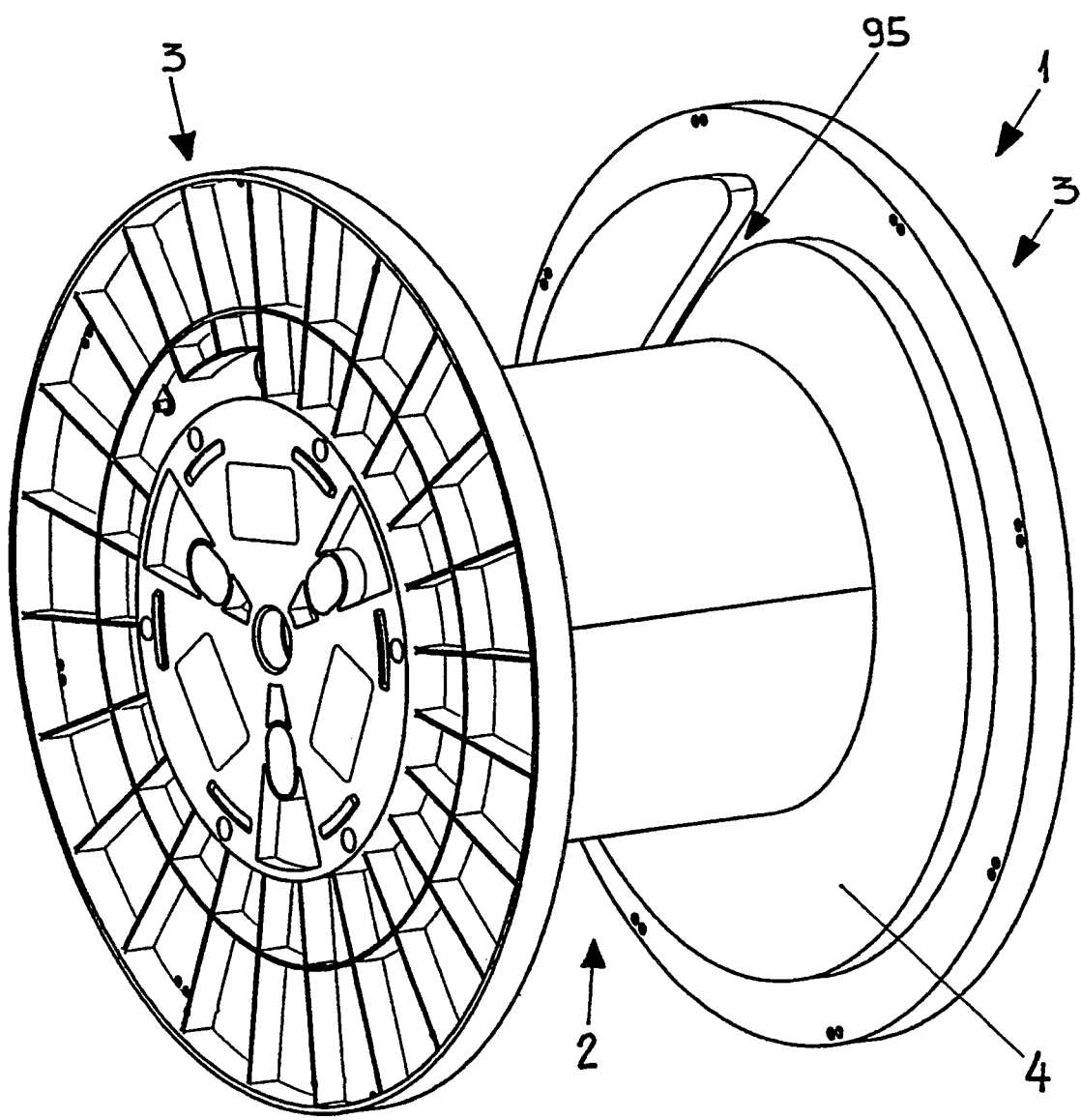
FIG. 1 shows a representation of a reel in perspective.

The reel 1 of FIG. 1 consists of a core 2, two identical flanges 3, and optionally also of a worm 4 inserted between one of the flanges 3 and the core 2. The core 2 is divided into two core halves 6 along a plane which contains the reel axis 5. The core halves 6, the flanges 3 and the worm 4 are cast of a high-strength plastic, preferably of a nylon block copolymer, for example "NYRIM" (Registered Trademark). NYRIM is mixed in liquid form from three components and is then cast in a mold at approximately atmospheric pressure. The mold has vent holes. Polymerization is subsequently initiated by an admixed catalyst. The polymerization creates an over-pressure of only about 0.3 bar. In contrast to an injection molding process, which requires high pressures, large-area parts can be produced on simple tool holders by means of this casting process. NYRIM is very tough, has good abrasion properties, and good chemical and heat stability, is fully recyclable, such that a granulate of NYRIM is a high-grade material for injection molding. When the utilized material is reused, primary quality is achieved at the secondary stage.

Figure 2:
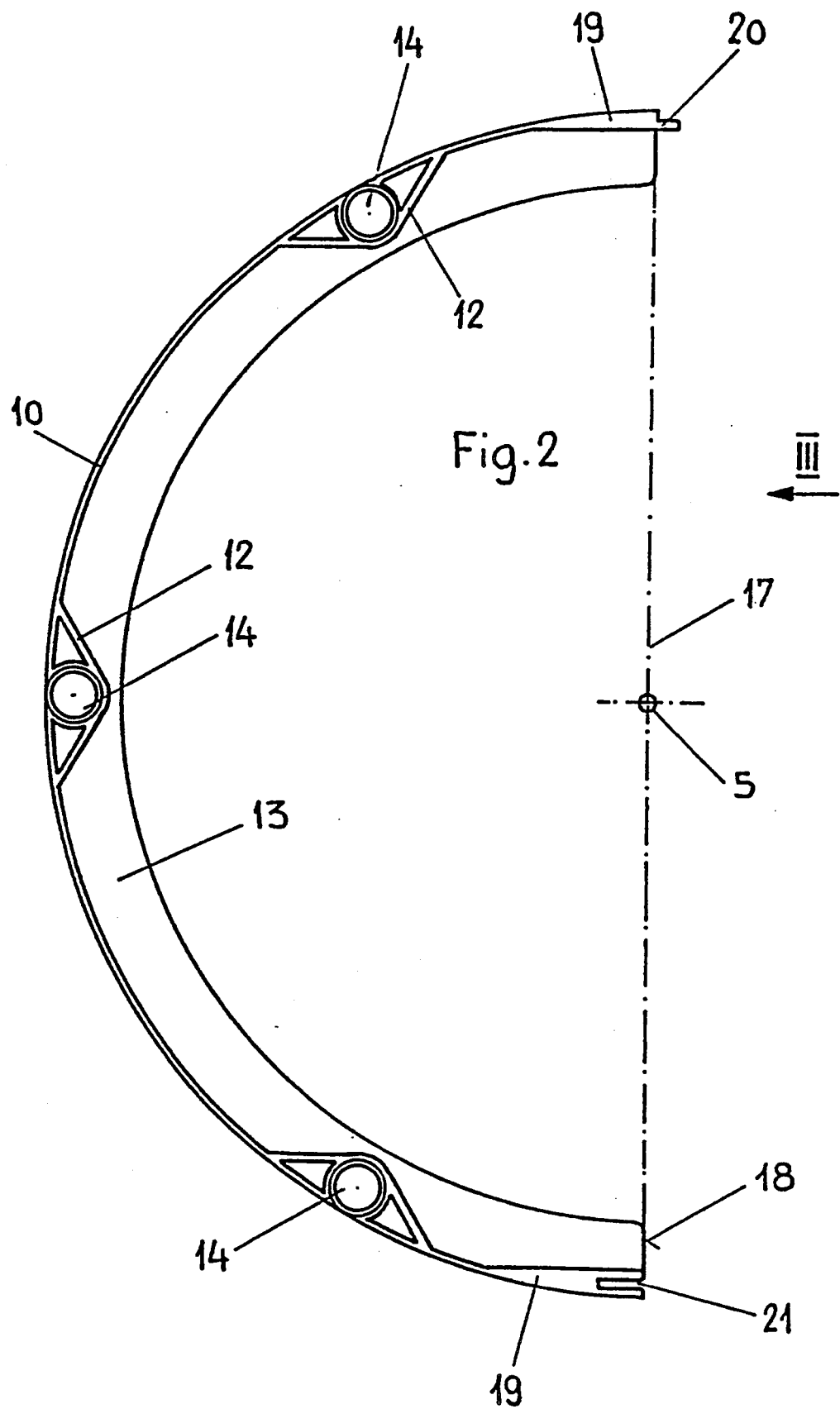
FIG. 2 shows a frontal view of a core half.
Figure 3:
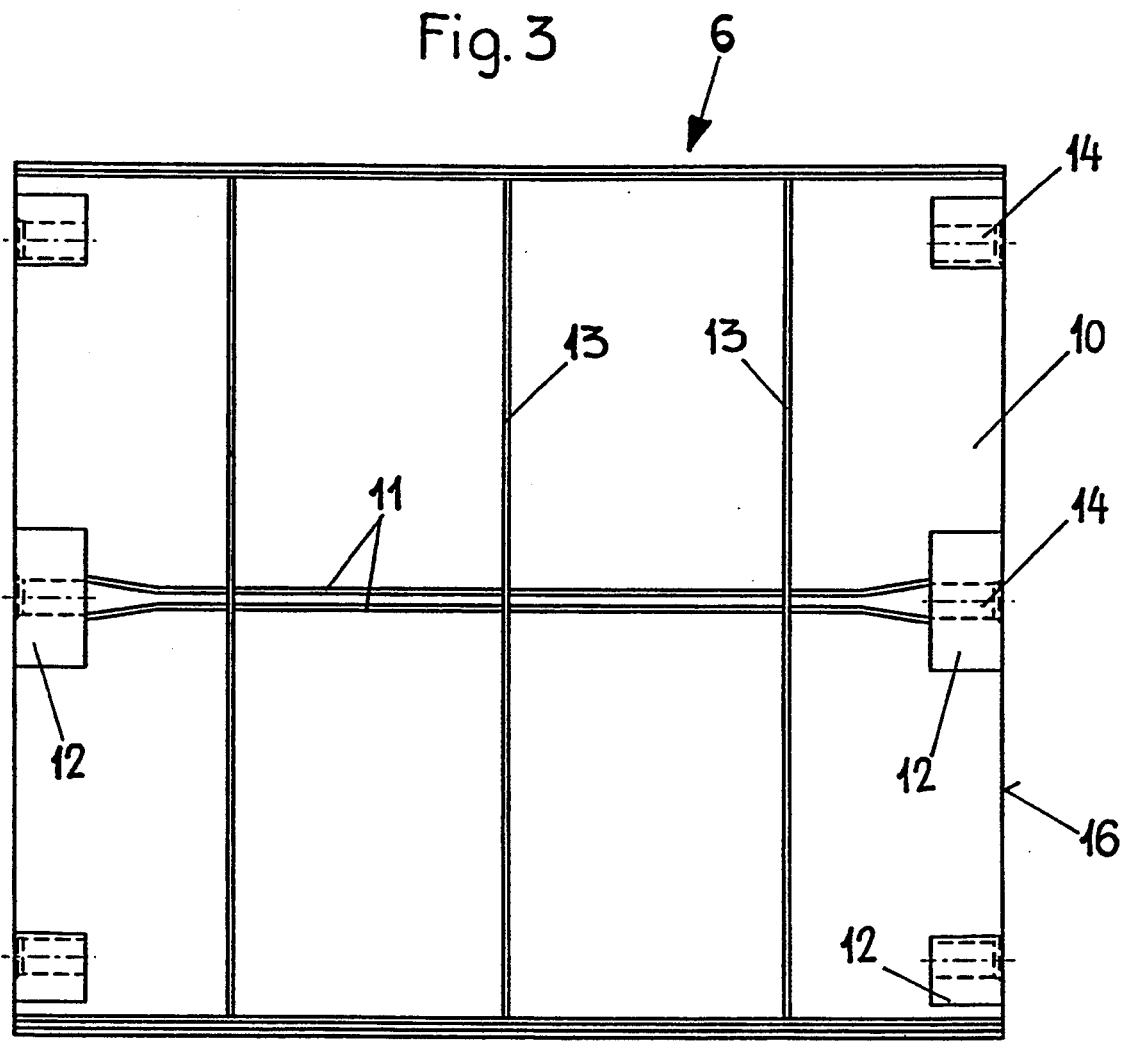
FIG. 3 shows a frontal view in the direction of the arrow III in FIG. 2, on a reduced scale.

FIGS. 2 and 3 show one of the two identical core halves 6. It has a cylindrical wall 10. Two axis-parallel longitudinal ribs 11 and also, depending on the length of the core 2, two or more reinforcement ribs 13 extending in the circumferential direction are integrally attached to the inside of the cylindrical wall. Three beads 12 are integrally attached to each of the two face ends. The beads 12 have axis-parallel, cylindrical holes 14. The holes 14 are open towards the face surfaces 16. The wall 10 is reinforced on both sides against the separation plane 17 which contains the axis 5. At the contact surface 18, which lies in the separation plane 17, an axis-parallel spring 20, which passes all the way through, is physically attached to one side of the bead 19. The other bead 19 has an axis parallel groove 21 of the same width.

Figure 4:
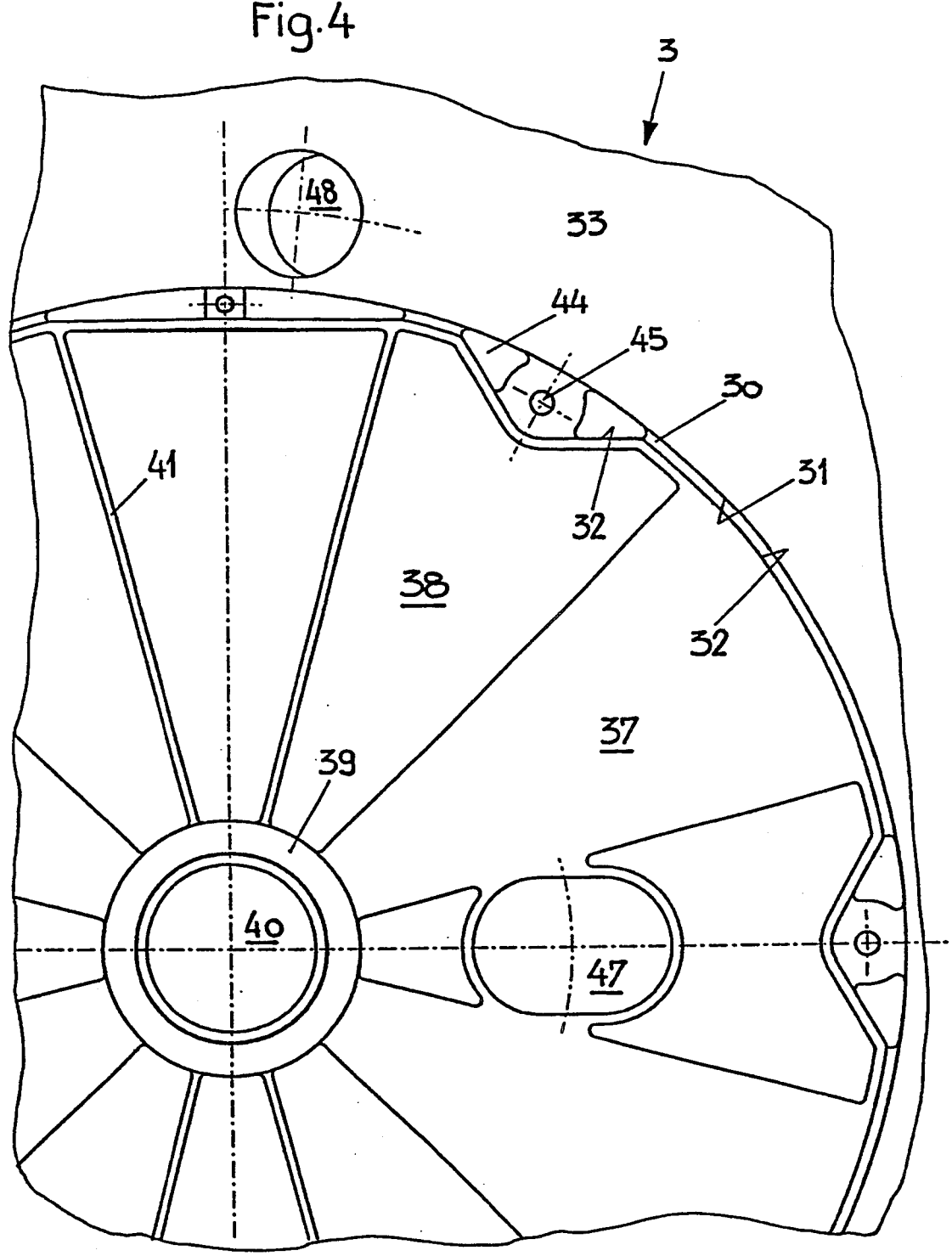
FIG. 4 shows a frontal view of a part of the flange.

FIG. 4 shows a portion of the inside of the flange 3. The flange 3 has the circumferential groove 30 with an outer flank 31, in the shape of a circular cylinder, and with an unround inner flank 32, which is matched to the inside contour of the assembled core 2. The front end of the core 2 is inserted into this groove 30, and is then connected positively to the flange 3 in the circumferential and radial directions. In this way, large forces and torques can be transmitted between the flange 3 and the core 2. The reel thus can also be constructed with a larger diameter, for which previous plastic reels could not be used. To achieve an engagement between the core 2 and the flange 3, which is free of backlash, the front ends of the core 2 and the groove 30 can be designed slightly wedge-shaped in their axial section.

Figure 5:
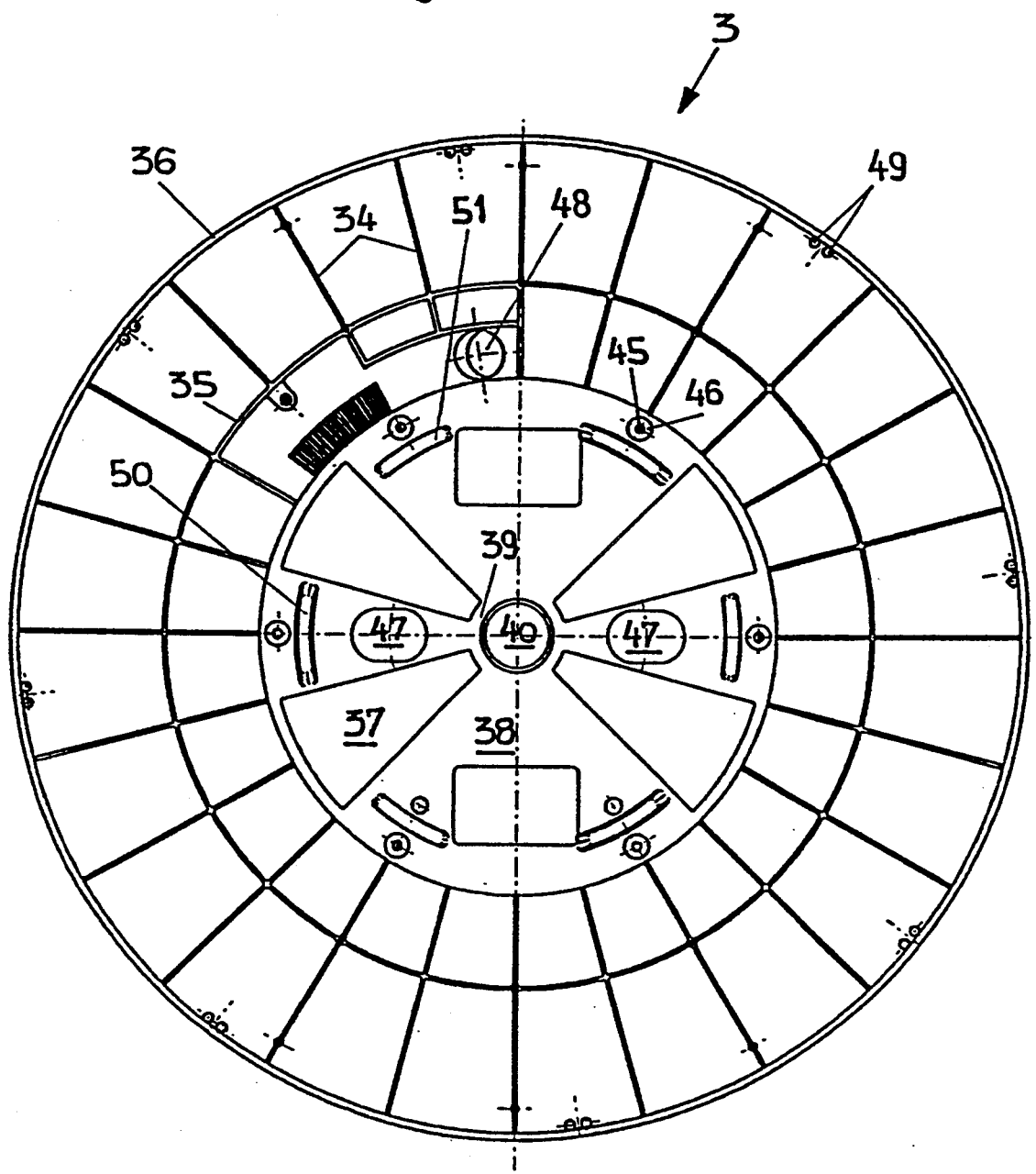
FIG. 5 shows an outside view of the flange.

Radially outside the groove 30, the flange 3 has a smooth, flat inside wall 33, which is reinforced on the outside by radial ribs 34 and by a cylindrical rib 35 (FIG. 5). An axial, cylindrical ring 36, protruding towards the outside, is integrally attached to the wall 33 along its periphery. Inside the groove 30, the flange 3 is reinforced by section-like recesses 37 and elevations 38 to a hub 39 with a through-hole 40. Two of these elevations 38, which are situated opposite one another, extend over a larger angular region and are used to affix a written text, for example to identify the cable type and the reel manufacturer. These wider elevations 38 are reinforced by further radial ribs 41.

Six through-holes 45 with cylindrical countersinks 46 from the outside are provided in the widened parts 44 of the groove 30. These widened parts 44 are used to receive the beads 12. The through-holes 45 are flush with the holes 14 of the inserted core 2. Two longitudinal holes 47 are used to insert a dog to drive or brake the reel on a mandrel which is placed through the hubs 39. An opening 48 is provided in the wall 33 outside the groove 30. The cable lead optionally can be brought out there. Furthermore, along the periphery, several pairs of holes 49 to fasten the cable end are distributed over the circumference. On its outside, the flange 3 has three protrusions 50 in the shape of a circular arc, and three recesses 51 in the shape of a circular arc. These are used for the positive engagement of reels that are stacked on one another. The protrusions 50 are wedge-shaped on both sides to reduce the risk of injury when the reel is rotated. The recesses 51 are less deep than the protrusions 50 are high. In this way, the two flanges that contact one another have a certain gripping distance from one another.

Figure 6:
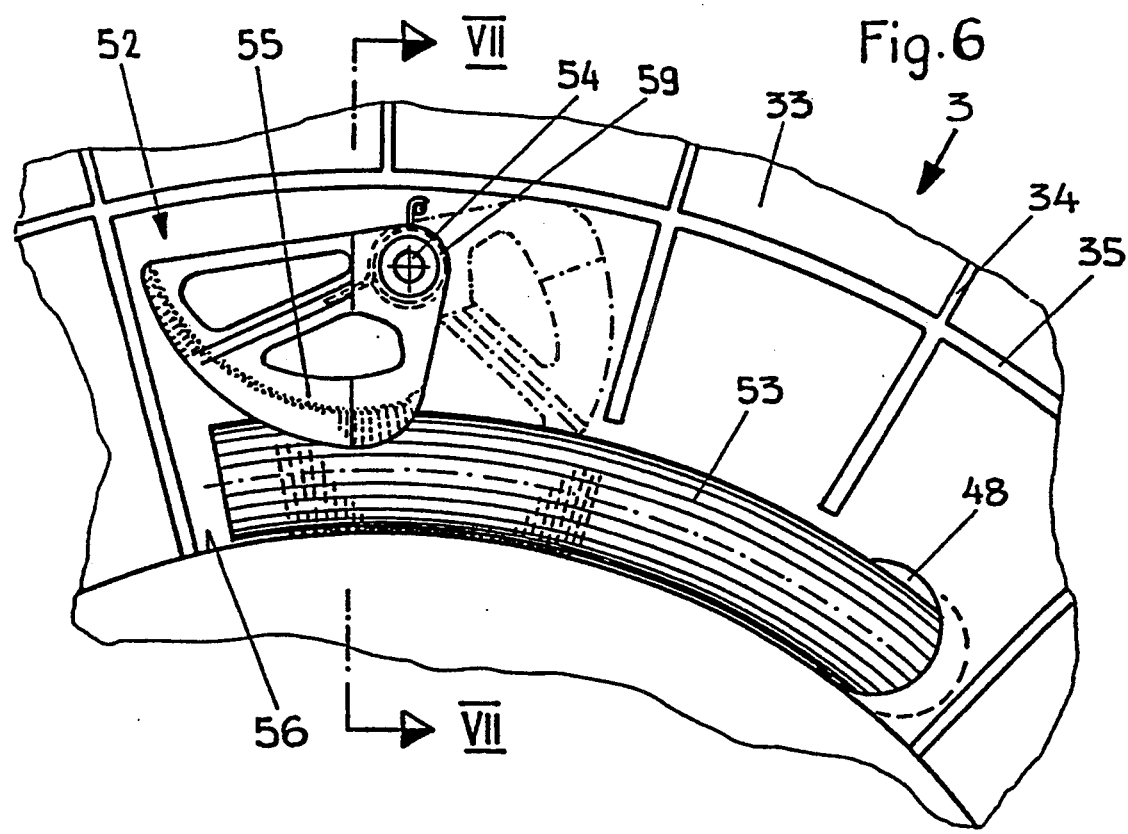
FIG. 6 shows a view of a clamping device.
Figure 7:
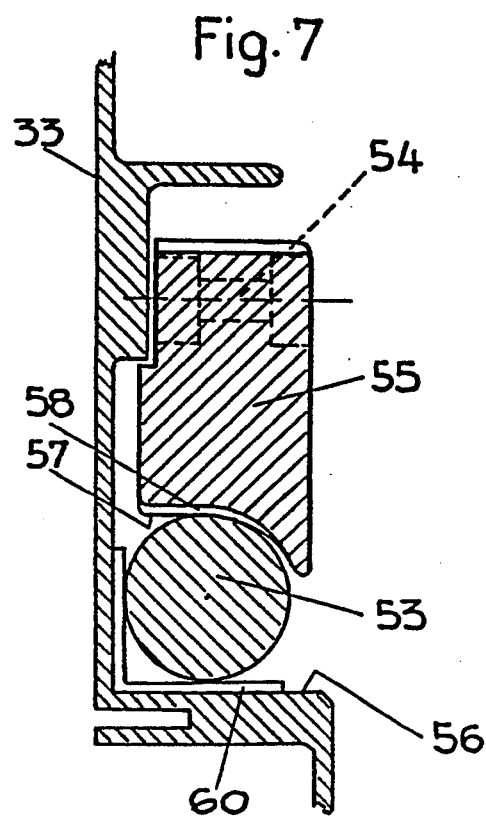
FIG. 7 shows a section along the line VII—VII in FIG. 6.

FIGS. 6 and 7 show a clamping device 52 for clamping a cable lead 53 which is brought out from the opening 48. The clamping lever 55 is pivotably mounted on an axle 54. On its periphery, the lever 55 has a spiral-shaped groove 57, which is open toward the wall 33 and toward a cylindrical surface 56, this groove 57 having small ribs 58. The groove 57 becomes narrower towards the outside. In the representation of FIG. 6, the lever 55 is loaded by a spring 59 in the counter-clockwise direction. The surface 56 and the wall 33 also have small ribs 60 in the region of the lever 55. To clamp the cable lead 53 fast, the lever 55 is first swung manually clockwise, and the cable lead 53 is conducted under the lever 55. When the lever 55 is released, it is pressed by the spring 59 against the cable lead 53. When there is tension on the cable, the cable is wedged because of the spiral-shaped groove 57, and is held securely. The groove, which constricts against the cable end, makes it possible to clamp different cable diameters without any problem.

The clamping device 52 actually can also be used sensibly with other reels or in other applications to clamp fast strand-shaped materials, for example ropes, pipes, or profiles.

Figure 8:
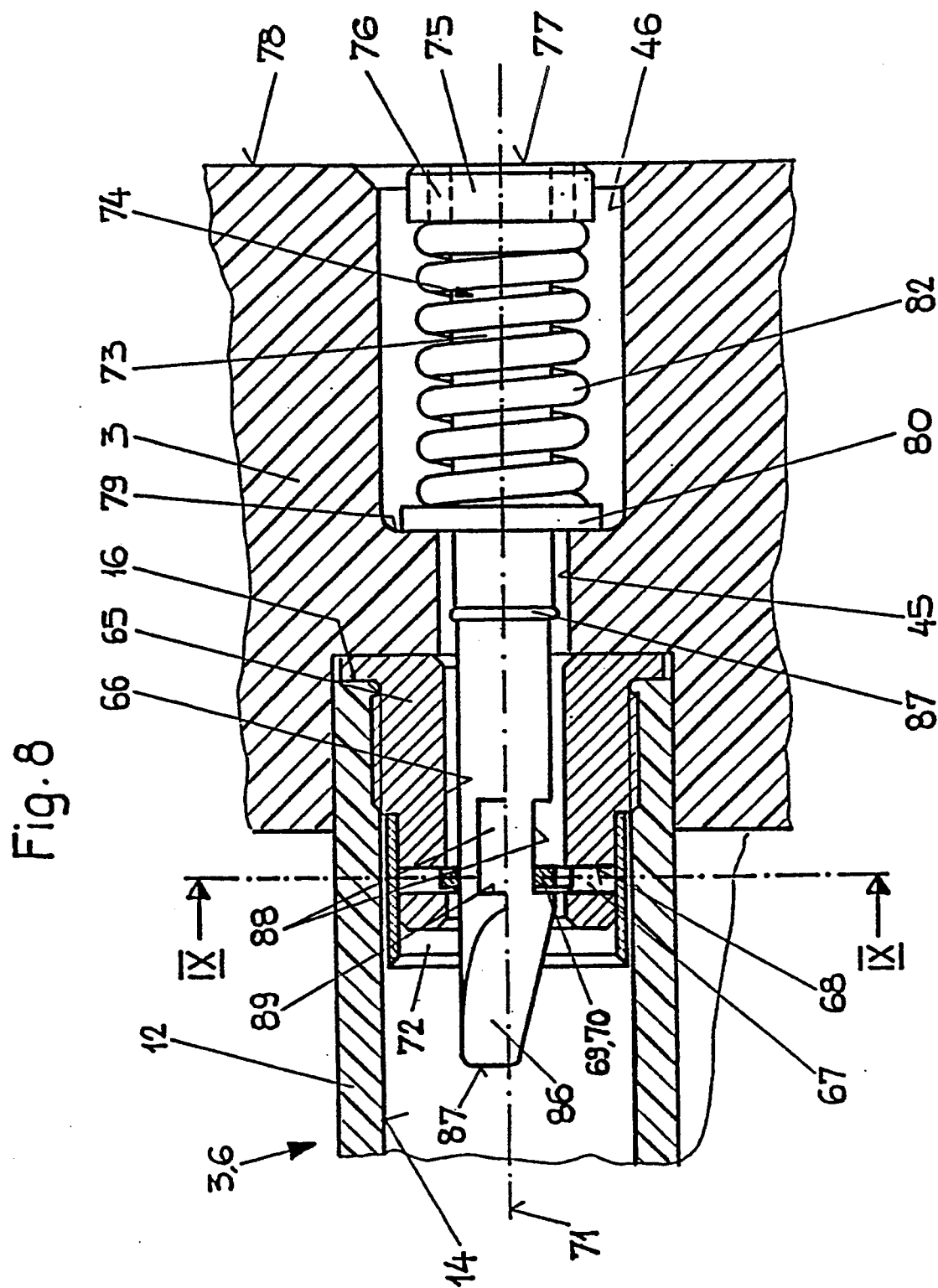
FIG. 8 shows a section through the connection between the flange and the core.
Figure 9:
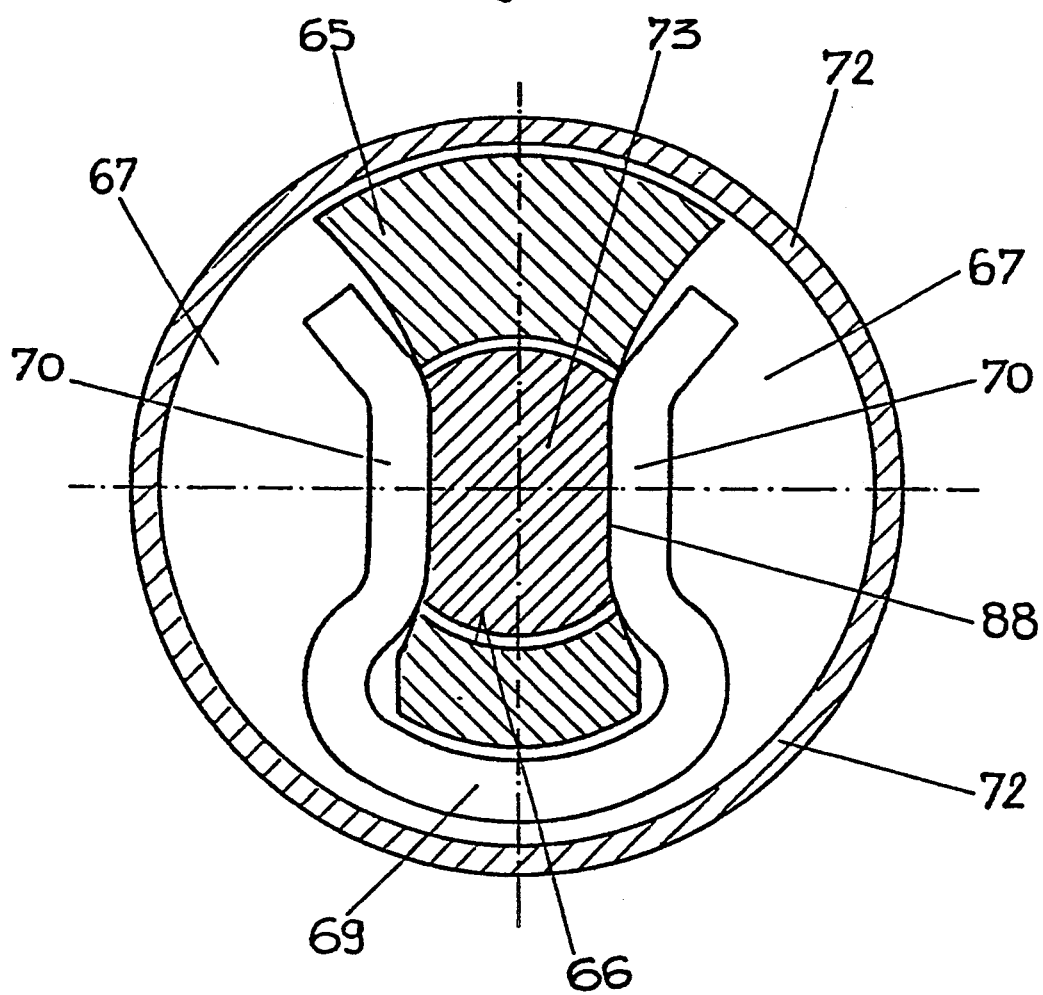
FIG. 9 shows a section along the line IX—IX in FIG. 8.

FIGS. 8 and 9 show the axial fastening of the flange 3 and the core 2. A metal insert 65 with a through-hole 66 is screwed into the holes 14. Adjoining the inside end, two slits 67 with a radial, flat shoulder 68 are milled into the insert 65. A spring clip 69, made of spring steel wire with a rectangular cross-section, is snapped into the slits 67. The two arms of the clip 69 contact the shoulder 68. The clip 69 cal also be secured by a sleeve 72. The sleeve 72 can also be closed at the face end. In this case, the insert 65 is also suited for integral casting. The shaft 73 of a pin 74 is put through the hole 45 of the flange 3. At its outer end, the pin 74 has a head 75 with axis-parallel holes 76 for inserting a special key. In the assembled state, the face surface 77 of the head 74 is approximately flush with the face surface 78 of the flange 3. A washer 80 lies on the base 79 of the recess 46. It is held on the shaft 73 by means of a snap ring, so that it cannot loosen. A pressure spring 82 is tensioned between the head 75 and the washer 80.

The inside end of the shaft 73 is shown below the axis 71 in the assembled state, turned by 90° above the axis 71. The shaft 73 has two opposite wedge-shaped surfaces 86, which constrict towards the face end 87 and two transverse grooves 88 at a distance from the face end 87. The shoulder 89 of these grooves 88, which is closer to the face end 87, is slightly undercut, so that the arms 70 latch securely in the grooves 88. For assembly, the pin 75 is pushed through the holes 45, 66, until the wedge-shaped surfaces 86 contact the arm 70. The pin 74 is thus positioned correctly automatically. Now the head 75 is struck with a hammer, so that the spring clip 69 is set, and the spring 82 is tensioned. The arms 70 latch in the grooves 88. For disassembly, the holes 76 of the head 75 are engaged by a special key, the pin 74 is turned by 90°, so that the arms 70 are spread again and the pin 74 is pressed out through the force of the spring 82.

The connection described above makes is possible to perform the assembly extremely quickly by means of untrained personnel and nevertheless to specify the axial connection force within close limits. This force also remains constant over a longer period of time despite possible creepage of the material.

By contrast, for example the screw connection with dynamometric keys requires more time as well as trained personnel, and does not by any means achieve the constancy and precision of the connecting force as does the connection described here.

The connection can easily be automated, by pressing in the pins 74, for example, by means of a stamp. The connection described above naturally can also be used with the same advantages to connect components other than the core and the flange of a reel.

Figure 10:
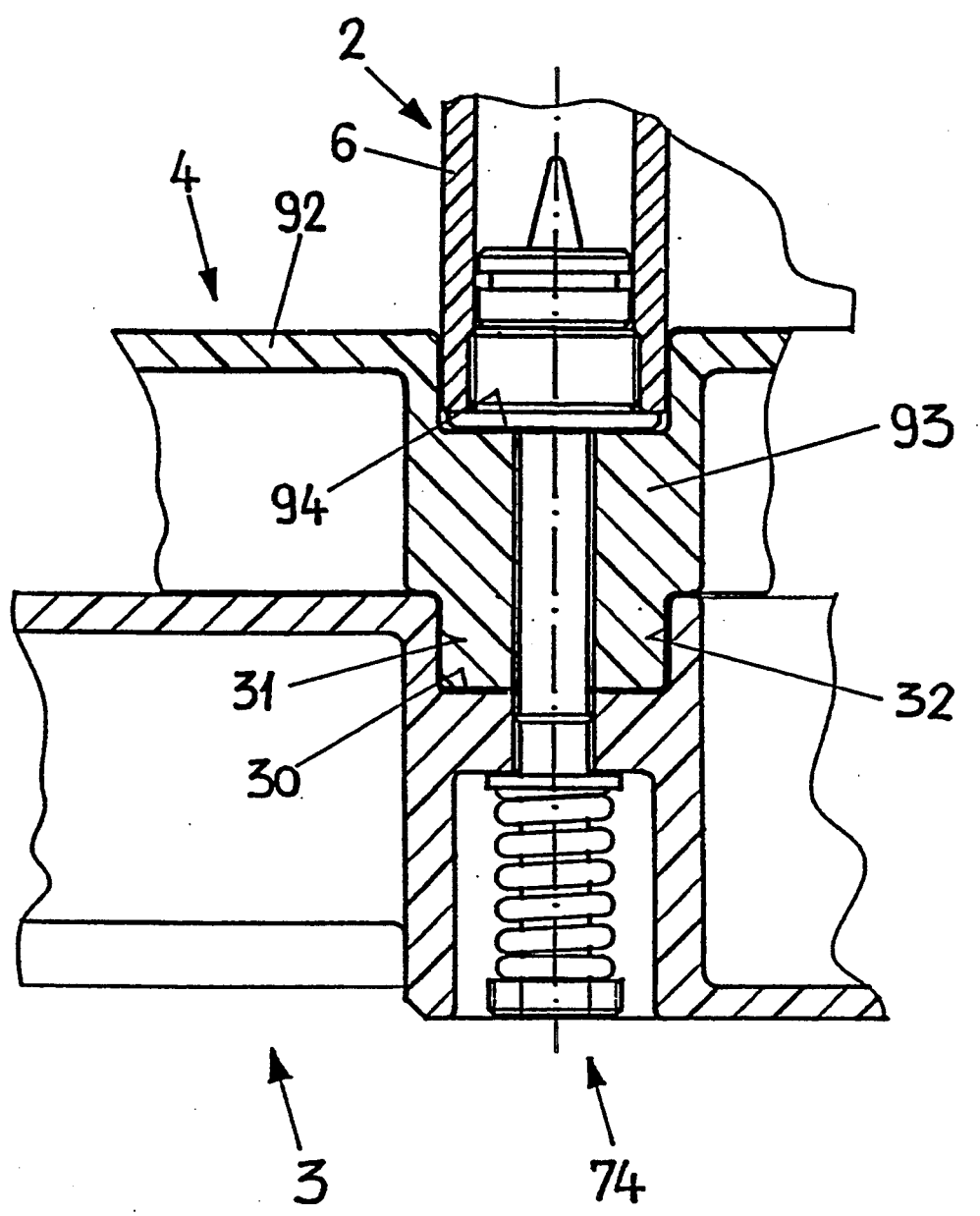
FIG. 10 shows a cut-out of an axial section through a worm.

FIG. 10 shows a portion of an axial section through the assembled worm 4. The worm 4 has a flat wall 92 which faces the interior space of the reel 1. The wall 92 is reinforced on its back side by ribs, which are not shown. On its inside, the wall 92 goes over into a tubular attachment 93. The attachment 93 has a groove 94, which has a design identical to that of the groove 30 of the flange 3, and into which groove the core 2 is inserted. At its other face, the attachment 93 has a shape that is identical to that of the face end of the core 2. This face end of the attachment 93 is inserted into the groove 30. At the location of the bead 12, the attachment has axis-parallel through-holes. A channel 95 extends tangentially from the inside diameter and goes over arc-shaped tangentially into the outside circumference.

If the worm is to be inserted, appropriately longer pins 74 are used. The type of connection of the worm 4, which has been described above, has the advantage that the interior space of the reel 1 is the same with and without the worm 4, with the same core length. Assembly of the worm requires hardly any additional effort.

If the cable lead is to be conducted through the opening 48, the worm 4 is suitably omitted.

Since the few metal parts of the reel 1 are all easily disassembled, the reel can be disposed of as a pure type in case it is damaged, which considerably facilitates reuse.

FIG. 11 shows a variant of the core 2, in which this core consists of three core thirds. The same reference symbols are used for analogous parts, so that a detailed description of these parts is obviated. The inside radius of the radial ribs 13 is here the same as the outside radius of the wall 10. Thus, the core segments 6 can readily be stacked. The casting mold for the design according to FIG. 11 can be produced cheaply. The disassembled core of FIG. 11 can be stored in a smaller space than the core 2 of FIGS. 2 and 3.

The flange 3 according to FIG. 12 is suited for the three-part core 2 of FIG. 11. Here, too analogous parts bear the same reference symbols.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A reel made of plastic for winding material such as cables, comprising:
    a hollow cylindrical core (2), formed of at least two core parts (6), the outside surfaces having circular cylindrical shapes,
    a flange (3) disposed on each of the two face ends of the core (2), each flange directly engaging the respective ends of the core (2) in the radial and circumferential directions, each flange being formed with a groove (30) open to one face end of core (2), said groove (30) having a substantially circular cylindrical outer flank (31) and an unround inner flank (32) adapted to the inside contour of said core (2) and wherein at least a first face side of the core (2) is inserted into the groove (30), and
    at least two removable connection elements (74) for each core part (6) on both sides thereof directly connecting the flanges (3) with the core (2) in the axial direction.

2. The reel of claim 1, further including a worm (4) of plastic with a channel (95) for bringing out the inside end of the wound material, the worm being fastened on the inside of one of the flanges (3), wherein the worm (4) has another circumferential groove (94) on one face side, said groove having a design that is identical to that of the groove (30) of the flange (3) and wherein the second face side of the core (2) is inserted into this further circumferential groove (94).

3. The reel of claim 1, wherein the core parts (6) include form locking engagement means for directly engaging another core part in the radial direction along contact surfaces (18).

4. The reel of claim 3, wherein the form locking engagement means at each contact surface (18) of the core parts (6) includes a groove (21) in one of the core parts running in the axial direction, and an integrally attached spring (20) on the adjoining core part is engaged within the groove (21).

5. A reel made of plastic for winding material such as cables, comprising:
    a hollow cylindrical core (2), formed of at least two core parts (6), the outside surfaces having circular cylindrical shapes,
    a flange (3) disposed on each of the two face ends of the core (2), each flange directly engaging the respective ends of the core (2) in the radial and circumferential directions, and
    at least two removable connection elements for each flange (3), for connecting the flange (3) with the core (2) in the axial direction,
    each connection element includes an axis-parallel pin (74) having a head (75) and a shaft (73), and the head (75) has key insertion elements (76) for turning the pin (74), and the shaft (73) has to wedge-shaped surfaces (86) at that end which is situated opposite to the head, and also has two diametrically opposite transverse grooves (88) which run perpendicular to the pin axis (71), a spring (82) is inserted between the head (75) and a washer (80), the core (2) is formed with a hole (14) at each connection point for receiving the connection element, and an insert (65) is inserted into each hole 14 at each connection point, and two spring elements (70) disposed in the insert at a distance from one another, which engage the transverse grooves (88) when the pin is inserted.

6. The reel of claim 5, wherein the washer (80) is retained on the shaft (73) so that it cannot loosen.

7. The reel of claim 5, wherein the spring elements are formed of two arms (70) of a clip (69) that is made of spring steel wire with a rectangular cross-section, and wherein the clip (69) is snapped into milled grooves (67) of the insert (65).

8. The reel of claim 6, wherein the spring elements are formed of two arms (70) of a clip (69) that is made of spring steel wire with a rectangular cross-section, and wherein the clip (69) is snapped into milled grooves (67) of the insert (65).

9. A reel made of plastic for winding material such as cables, comprising:
    a hollow cylindrical core (2), formed of at least two core parts (6), the outside surfaces having circular cylindrical shapes,
    a flange (3) disposed on each of the two face ends of the core (2), each flange directly engaging the respective ends of the core (2) in the radial and circumferential directions, at least one of the flanges (3) being formed with a cable lead-through opening (48) adjoining the outside circumference of the core (2), and a spring-loaded clamping element (52) is pivotably mounted at the flange next to the opening (48), said clamping element (52) having a spiral-shaped groove (57) for clamping a cable lead (53) that is conducted through the opening (48), and at least two removable connection elements for each core part (6) on both sides thereof directly connecting the flange (3) with the core (2) in the axial direction.

* * * * *